United States Patent [19]
Ray-Chaudhuri et al.

[11] 3,864,436
[45] Feb. 4, 1975

[54] PROCESS FOR THE PREPARATION OF BIS-(2,3-DIBROMOPROPYL) PHOSPHORYL CHLORIDE

[75] Inventors: Dilip K. Ray-Chaudhuri, Sommerville; Carmine P. Iovine, Somerset, both of N.J.

[73] Assignee: National Starch and Chemical Corporation, New York, N.Y.

[22] Filed: Aug. 28, 1972

[21] Appl. No.: 284,214

[52] U.S. Cl. ............... 260/975, 260/960, 260/974
[51] Int. Cl. ............................................. C07f 9/14
[58] Field of Search ................... 260/960, 974, 975

[56] References Cited
UNITED STATES PATENTS 2,678,330  5/1954  Gorder et al. ..................... 260/960
3,268,597  8/1966  Clemons et al. ................ 260/974 X

OTHER PUBLICATIONS

Houben–Weyl, Methoden der Organische Chemie, Vol. 12/2, (1964), pages 274–276.

*Primary Examiner*—Lorraine A. Weinberger
*Assistant Examiner*—Richard L. Raymond

[57] ABSTRACT

A direct phosphorylation process for preparing bis-(2,3-dibromopropyl) phosphoryl chloride which comprises reacting, at elevated temperatures, essentially stoichiometric concentrations of 2,3-dibromopropanol and phosphorus oxychloride, the resulting phosphoryl chloride serving as an intermediate for the preparation of polymerizable compounds.

3 Claims, No Drawings

PROCESS FOR THE PREPARATION OF BIS-(2,3-DIBROMOPROPYL) PHOSPHORYL CHLORIDE

This invention relates to a process for the direct phosphorylation of 2,3-dibromopropanol in order to prepare pure bis-(2,3-dibromopropyl) phosphoryl chloride.

The use of phosphorus and halogen containing monomers to impart fire retardant properties to polymers is well known to those skilled in the art. Such monomers are typically prepared by reacting dialkyl chlorophosphates with hydroxyalkyl, aminoalkyl or glycidyl acrylates and methacrylates, as disclosed in U.S. Pat. Nos. 2,791,574 and 2,993,033, British Pat. No. 877,905 and German Pat. No. 1,222,056. It has been noted, however, that the product specificity and purity of the chlorophosphate intermediate is the critical factor in the successful preparation of useful fire retardant polymers. For example, a lack of product specificity in the dialkyl chlorophosphate intermediate, i.e. the presence of a monoalkyldichlorophosphate component therein, eventually results in the formation of a diacrylate product which, in turn, causes gellation in the polymerization mixture and the formation of insoluble, useless polymers.

To date, no satisfactory approach for preparing pure dialkyl monochlorophosphates directly from aliphatic alcohols and phosphorus oxychloride has been developed. Rather, the prior art methods for preparing such compounds have been either uneconomical, cumbersome, indirect methods or direct methods which have required difficult purification procedures. Typical indirect methods are noted in the following equations:

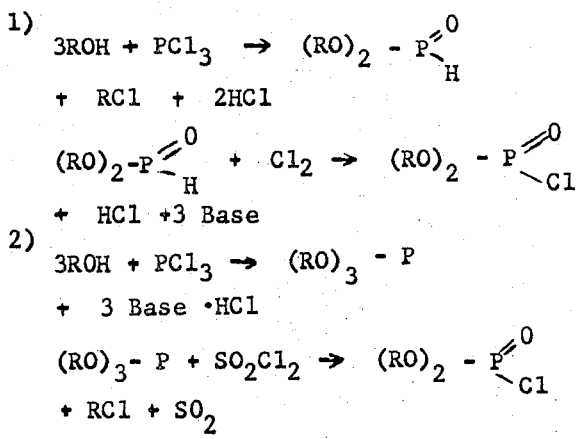

Thus, these techniques where the appropriate alcohol is reacted with phosphorus trichloride to produce either the dialkyl or trialkyl phosphite which, in turn, is chlorinated in order to produce the desired reaction product, are disadvantageous inasmuch as they require a multiplicity of reactions which reduce the efficiency and economy of the process. Furthermore, such reaction processes require an additional mole of alcohol reactant in order to prepare an amount of product comparable to that which would be obtained if a direct reaction procedure could be used.

Where attempts have been made to effect the direct phosphorylation of aliphatic alcohols with phosphorus oxychloride, the results have been the formation of a broad and unpredictable spectrum of products consisting of mono-, di- and trialkyl phosphates as well as phosphoric acid-type compounds. This mixture must necessarily be subjected to difficult purification techniques in order to provide a suitable product for subsequent monomerization. Such difficulties are due to: (a) the lack of reagent specificity and (b) the action of free hydrogen chloride which results in the formation of phosphoric acid type by-products thus reducing the phosphate ester yield.

For example, if an acid scavenger like pyridine is used to remove the free hydrogen chloride, the specificity of the reaction mixture is totally lost and a broad distribution of mono-, di- and trialkyl phosphates is obtained. In order to isolate the desired dialkylchlorophosphate, a complex purification of the resulting mixture would be required so as to remove the pyridine hydrochloride as well as the mono- and trialkylphosphate products. Furthermore, such purification would be extremely difficult in view of the fact that the high temperatures required to separate these products would also tend to have a degradative effect upon them.

On the other hand, if a direct approach is attempted without the presence of an acid scavenger, elaborate precautions must be taken to remove the free hydrogen chloride simultaneously with its formation. Where such precautions are not taken, as noted in the following equations:

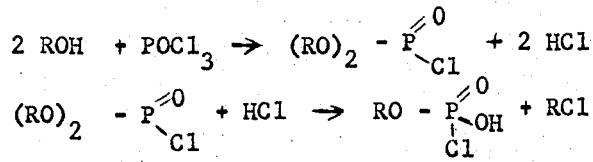

HCl capture reactions occur which yield high boiling phosphoric acid type impurities in the chlorophosphate mixture which are difficult to remove. Such capture reactions also adversely affect the weight balance and the chloride assay in the reaction.

The prime object of this invention is to provide a direct phosphorylation process for the preparation of a phosphoryl chloride reaction product, namely, bis-(2,3-dibromopropyl) phosphoryl chloride.

A further object is to provide this phosphoryl chloride product by the direct phosphorylation of an aliphatic alcohol, 2,3-dibromopropanol, with phosphorus oxychloride.

Still a further object is to provide such a process which yields a substantially pure bis-(2,3-dibromopropyl) phosphoryl chloride reaction product.

Another object is to eliminate the by-product formation and acid capture reactions which would be anticipated in such a process.

Various other objects and advantages of this invention will become apparent from a reading of the following disclosure.

We have now surprisingly discovered a direct phosphorylation process which is specific for the preparation of bis-(2,3-dibromopropyl) phosphoryl chloride. Thus, by directly reacting 2,3-dibromopropanol with phosphorus oxychloride, in a 2:1 molar ratio, the desired reaction product is prepared without encountering the difficulties inherent in the prior art processes. Since this process is an attempt at the direct phosphorylation of 2,3-dibromopropanol, an aliphatic alcohol, it would have been anticipated that the variable product distribution and the acid capture side reactions of the prior art techniques would also result from the instant process. This is not the case, however, inasmuch as the instant direct phosphorylation proceeds smoothly and results in the preparation of a pure reaction product in very high yields. Accordingly, the need for effecting hydrogen chloride removal and instituting complex purification procedures is removed. The specificity of the reaction product is clearly demonstrated by its ready conversion to a polymerizable species which, in turn, can be readily polymerized to produce soluble polymers which provide the desired permanent fire retardant properties. Likewise, the absence of acid capture reactions is demonstrated by the acceptable weight balance and chloride assay which is achieved.

As previously indicated, this process is substantially specific to the phosphorylation of 2,3-dibromopropanol. Thus, other halo- and polyhaloalkanols are not suitable for the preparation of specific monochlorophosphates either because they are unreactive, they undergo acid capture reaction, or they lead to nonspecific reaction products.

The direct phosphorylation process of this invention proceeds by means of the following reaction mechanism:

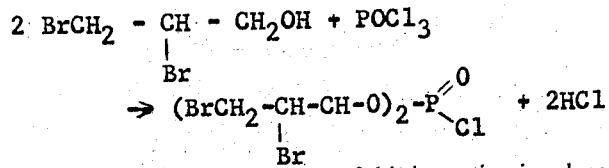

It is thus seen that the process of this invention involves mixing, preferably in an inert atmosphere, 2,3-dibromopropanol with phosphorus oxychloride and thereafter heating the resulting mixture at atmospheric pressure for a period of time sufficient to fully convert the halo-alkanol, such time periods generally ranging from about 12 to 15 hours. The reaction temperatures which are applicable to this process generally range from about 50° to 125°C. The two reactants are present in the reaction mixture in approximately stoichiometric concentrations, i.e. in approximately a 2 to 1 molar ratio, with a slight excess of phosphorus oxychloride frequently being used. Contrary to the prior art systems, no special precautions need be taken to remove the free hydrogen chloride produced in the reaction. A brief period of heating under reduced pressure conditions may be utilized at the end of the reaction in order to remove any residual hydrogen chloride from the reaction product. The resulting bis-(2,3-dibromopropyl) phosphoryl chloride is a viscous amber liquid. It is produced in high yields and will generally contain no more than about 0.5 percent, by weight, of the monoalkyl dichloro by-product.

If desired, a metallic chloride catalyst such as magnesium chloride, aluminum chloride, calcium chloride or zinc chloride may be utilized to expedite the phosphorylation reaction. Such catalysts will generally be used in concentrations ranging from about 0.01–0.1 percent, by weight, in order to substantially reduce the required reaction time.

As previously mentioned, the resulting bis-(2,3-dibromopropyl) phosphoryl chloride is a valuable intermediate for preparing phosphorus-containing polymers through monomerization with hydroxyalkyl or glycidyl acrylates and methacrylates. The resulting polymers are extremely effective as durable fire retardant coatings and binders for a variety of solid substrates. Reference may be made to our co-pending application Ser. No. 257,772, filed May 30, 1972, now U.S. Pat. No. 3,830,769 for further information regarding the manner in which the novel phosphoryl chloride of this invention may be used in the preparation of fire retardant polymers.

The following examples will further illustrate the embodiment of this invention. In these examples all parts given are by weight unless otherwise noted.

EXAMPLE I

This example illustrates the preparation of bis-(2,3-dibromopropyl) phosphoryl chloride by means of the novel process of this invention.

A reaction system fitted with condensers, means for mechanical agitation and cold traps was purged with dry nitrogen gas and then charged with 1941.3 parts of 2,3-dibromopropanol and 685 parts of phosphorus oxychloride. The reaction mixture exothermed slowly over a 2-hour period until it reached a temperature of 31°C. After maintaining the reaction mixture at this temperature for an additional hour, the mixture was heated to 80°–90°C at a rate of 0.5°C per minute, and the reaction was allowed to proceed at this temperature for a period of 12 hours. During the course of the reaction, free hydrogen chloride evolved from the reaction mixture. The conversion of the dibromopropanol was virtually complete at the end of the 12 hour heating period, as indicated by the absence of an infra-red absorption band at 3440 cm-1 which is indicative of the presence of hydroxyl groups.

The reaction mixture was 80°evacuated to 12 mm Hg at 90°–90°C and held at this pressure for a period of 2 hours in order to remove any residual hydrogen chloride. The resulting bis-(2,3-dibromopropyl) phosphoryl chloride was a viscous amber liquid with a density of 2.13 grams per milliliter, percent Cl of 6.73 (6.88 theory) and a weight balance of 99.7 percent of theory.

The above described procedure was then identically repeated with the exception that 0.05 percent, by weight, of magnesium chloride catalyst was added to the system. It was noted that only a 5-hour reaction period was required in order to prepare a comparable phosphoryl chloride product.

EXAMPLE II

This example illustrates the purity of the phosphoryl chloride prepared in Example I hereinabove as indicated by the ready polymerizability of a methacrylate monomer prepared therefrom.

A reaction vessel equipped with funnel, reflux condenser with drying tube, and means for mechanical agitation was charged with 400 parts bis-(2,3-dibromopropyl) phosphoryl chloride (from Example I), 200 parts dry benzene and 64 parts NaOH dried pyridine. Thereafter, 104 parts of hydroxypropylacrylate was slowly added with mixing over a 1 1/2 hour period. During the addition, the reaction temperature rose from 25°C to a maximum of 41.5°C and was held at 40°–42°C by periodic cooling. Pyridine hydrochloride precipitated as the reaction proceeded. After the slow addition, the reaction mixture was heated at 40°–45°C for two hours and then cooled and filtered to remove pyridine HCl. The filtrate was washed, dried and vacuum distilled to remove solvent whereupon 547 parts of bis-(2,3-dibromopropyl) acryloxy propyl phosphate monomer was recovered.

Thereafter, a reaction vessel fitted with a condenser and means for mechanical agitation was charged with 15 parts bis-(2,3-dibromopropyl) acryloxy propyl phosphate, 15 parts methyl methacrylate, 31 parts benzene and 0.15 parts $\alpha, \alpha'$-azobisisobutyronitrile. The reaction mixture was purged ½ hour at room temperature with nitrogen and then brought to reflux at 84.5°C. The polymerization initiated at 83°C as evidenced by the increase in viscosity of the polymerization mixture. 130 parts of additional benzene was added slowly over a three hour period whereupon the reaction mixture was cooled to room temperature.

The resulting polymer was free of insolubles and exhibited a 95.2 percent monomer conversion. This successful copolymerization thus clearly indicated the product specificity and purity of the phosphoryl chloride intermediate prepared in Example I hereinabove.

EXAMPLE III

This example illustrates the inability of various mono- and polyhalo alkanols to duplicate the reactivity and product specificity of 2,3-dibromopropanol when subjected to the direct phosphorylation process of this invention.

Part A—2-chloroethanol

A reaction vessel equipped as in Example I, was charged with 311 parts of phosphorus oxychloride and 326 parts of 2-chloroethanol, which were added over a 3 hour period. The reaction was exothermic and the temperature was maintained at 38°–40°C by external cooling. The reaction mixture was then heated at 75°–80°C for a period of 4 hours during which time hydrogen chloride evolved from the reaction mixture and complete conversion of the 2-chloroethanol occurred. The reaction mixture was then evacuated to 12 mm Hg at 80°C for removal of residual hydrogen chloride. The bis-(2-chloroethyl) phosphoryl chloride product was a colorless liquid with percent Cl of 14.61 (14.72 theory) and a weight balance of 98.98 percent of theory.

The resulting phosphoryl chloride was then reacted with hydroxyethyl methacrylate according to the general procedure set forth in Example II in order to prepare the bis-(2-chloroethyl) methacryloxyethyl phosphate monomer.

Polymerization of the monomer with methyl methacrylate was then conducted in accordance with the procedure set forth in Example II. It was noted, however, that a rapid increase in the viscosity of the polymerization mixture occurred approximately 10 minutes after the initiation of reflux. Despite the addition of extra benzene, the viscosity increase continued to the point where the mixture gelled and the polymer was discarded.

This inability to prepare a satisfactory copolymer is thus clearly indicative of the poor product specificity and purity which existed in the phosphoryl chloride intermediate despite its acceptable weight balance and chloride assay.

Part B—1,3-dichloro-2-propanol

A reaction vessel was charged with 258 parts 1,3-dichloro-2-propanol and 158.5 parts phosphorus oxychloride. The reaction mixture was heated at 85°–90°C for 20 hours during which time only trace quantities of HCl were evolved. A gas chromatographic analysis of the reaction mixture indicated only a 10 percent conversion of available 1,3-dichloro-2-propanol. This was also confirmed by infra-red analysis. The substantial inability of this aliphatic alcohol to react with phosphorus oxychloride was thus clearly illustrated.

Part C—2,3dibromoallyl alcohol

A reaction vessel was charged with 151.4 parts 2,3-dibromoallyl alcohol and 54 parts phosphorus oxychloride. The reaction was not exothermic and was consequently heated to 75°–80°C over a 4 hour period. During this time, HCl was evolved from the reaction mixture. After heating at 75°–80°C for an additional 2 hours, the reaction mixture was evacuated to 12 mm Hg and maintained for 2 hours. Infra-red analysis indicated complete conversion of the alcohol. The bis-(2,3-dibromoallyl) phosphoryl chloride product was a dark amber syrup.

Analysis of the resulting product mixture yielded the following data.

|  | Actual | Theoretical |
|---|---|---|
| Weight balance | 185.6 | 179 |
| % Cl | 5.34 | 7.4 |

The disparity noted in this data, and particularly in the low assay for percent Cl thus indicates the occurrence of acid capture reactions and the resulting presence of phosphoric acid type impurities in the chlorophosphate mixture.

Summarizing, it is seen that this invention provides a novel direct phosphorylation process for the preparation of bis-(2,3-dibromopropyl) phosphoryl chloride.

Variations may be made in procedures, proportions and materials without departing from the scope of this invention as defined by the following claims.

We claim:

1. A process for preparing bis-(2,3-dibromopropyl) phosphoryl chloride containing less than 0.5 percent, by weight, of 2,3-dibromopropyl dichlorophosphate impurities which comprises reacting at temperatures ranging from about 50° to 125°C. essentially stoichiometric concentrations of 2,3-dibromopropanol and phosphorus oxychloride.

2. The process of claim 1 which is conducted in the presence of a metallic chloride catalyst.

3. The process of claim 2, wherein said catalyst is present in a concentration of from about 0.01 to 0.1 percent, by weight.

* * * * *